US012414063B2

United States Patent
Lins De Medeiros et al.

(10) Patent No.: US 12,414,063 B2
(45) Date of Patent: Sep. 9, 2025

(54) FRONTHAUL NETWORK UNIT AND METHOD THEREIN FOR SYNCHRONIZATION OVER A FRONTHAUL NETWORK

(71) Applicant: Telefonaktiebolaget LM Ericsson (publ), Stockholm (SE)

(72) Inventors: Eduardo Lins De Medeiros, Sundbyberg (SE); Igor Almeida, Indaiatuba-SP (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 443 days.

(21) Appl. No.: 18/003,604

(22) PCT Filed: Jul. 1, 2020

(86) PCT No.: PCT/SE2020/050693
§ 371 (c)(1),
(2) Date: Dec. 28, 2022

(87) PCT Pub. No.: WO2022/005350
PCT Pub. Date: Jan. 6, 2022

(65) Prior Publication Data
US 2023/0239817 A1    Jul. 27, 2023

(51) Int. Cl.
*H04W 56/00*    (2009.01)
*H04L 5/14*    (2006.01)

(52) U.S. Cl.
CPC ....... *H04W 56/0015* (2013.01); *H04L 5/1469* (2013.01)

(58) Field of Classification Search
CPC .. H04W 56/0015; H04L 5/1469; H04J 3/0667
See application file for complete search history.

(56) References Cited

U.S. PATENT DOCUMENTS 11,265,835 B1 *    3/2022   Russell ................. H04J 3/0658
12,294,961 B2 *    5/2025   Van Phan ........... H04L 41/0895
(Continued)

FOREIGN PATENT DOCUMENTS

| EP | 3331176 A1 * | 6/2018 | ............ H04J 3/0638 |
| WO | WO-2018017468 A1 * | 1/2018 | ............ H04W 56/00 |
| WO | 2021/080478 A1 | 4/2021 | |

OTHER PUBLICATIONS

International Search Report and Written Opinion issued in International Application No. PCT/SE2020/050693 dated May 7, 2021 (11 pages).

(Continued)

Primary Examiner — Wutchung Chu
(74) Attorney, Agent, or Firm — Rothwell, Figg, Ernst & Manbeck, P.C.

(57) ABSTRACT

A method performed by a first fronthaul network unit (RU1, RU2, ..., RUm) for synchronizing with a second fronthaul network unit (GM; DU1, DU2, ..., DUn) across a fronthaul network (100) carrying TDD radio transmissions through obtaining control information indicating UL and DL time periods of TDD radio transmissions and local timing information in a first fronthaul network unit and determining: a first set of synchronization messages transferred between the units within determined fronthaul DL and UL intervals during which there are no TDD transmissions, and a second set of synchronization messages transferred outside of the determined intervals, and synchronizing, based on the synchronization messages, depending on which set the synchronization message belongs to.

20 Claims, 7 Drawing Sheets

(56) References Cited

U.S. PATENT DOCUMENTS

| | | | | |
|---|---|---|---|---|
| 2013/0039359 | A1* | 2/2013 | Bedrosian | H04J 3/0667 |
| | | | | 370/350 |
| 2019/0089505 | A1* | 3/2019 | Hapsari | H04W 88/08 |
| 2021/0014085 | A1* | 1/2021 | Chen | H04L 25/0224 |
| 2021/0160802 | A1* | 5/2021 | Sandberg | H04L 27/3863 |
| 2021/0219253 | A1* | 7/2021 | Van Phan | H04L 41/0893 |
| 2021/0382745 | A1* | 12/2021 | Eker | G06F 9/45558 |
| 2021/0385686 | A1* | 12/2021 | Ahmed | H04W 28/06 |
| 2022/0337973 | A1* | 10/2022 | Lutsky | G01S 5/0218 |
| 2022/0369251 | A1* | 11/2022 | Medeiros | H04B 7/2643 |
| 2023/0209549 | A1* | 6/2023 | Amuru | H04L 5/0094 |
| | | | | 370/329 |

OTHER PUBLICATIONS

Hailu, D. H. et al., "Mobile fronthaul transport options in C-RAN and emerging research directions: A comprehensive study", Elsevier, Optical Switching and Networking, vol. 30 (2018), (pp. 40-52).

Checko, A. et al., "Synchronization Challenges in Packet-based Cloud-RAN Fronthaul for Mobile Networks", IEEE ICC 2015—Workshop on Cloud-Processing in Heterogeneous Mobile Communication Networks (IWCPM), 2015 (pp. 2721-2726).

Giorgi, G. et al., "Performance Analysis of Kalmar-Filter-Based Clock Synchronization in IEEE 1588 Networks", IEEE Transactions on Instrumentation and Measurement, vol. 60. No. 8, Aug. 2011 (pp. 2902-2909).

Hadzic, I. et al., "On Packet Selection Criteria for Clock Recovery", IEEE, 2009 (6 pages).

IEEE, "IEEE Standard for a Precision Clock Synchronization Protocol for Networked Measurement and Control Systems", IEEE Std 1588, 2008 (289 pages).

3GPP TS 38.213 V15.6.0 (Jun. 2019), 3rd Generation Partnership Project; Technical Specification Group Radio Access Network; NR; Physical layer procedures for control (Release 15), Jun. 2019 (107 pages).

3GPP TS 36.211 V15.8.1 (Jan. 2020), 3rd Generation Partnership Project; Technical Specification Group Radio Access Network; Evolved Universal Terrestrial Radio Access (E-UTRA); Physical channels and modulation (Release 15), Jan. 2020 (240 pages).

Freire, I. et al., "Analysis of Controlled Packet Departure to Support Ethernet Fronthaul Synchronization via PTP", IEEE, 2018 (6 pages).

IEEE Std 802.3, (Revision of IEEE Std 802.Mar. 2002 including all approved amendments), "IEEE Standard for Information technology—Telecommunications and information exchange between systems—Local and metropolitan area networks—Specific requirements" 2005 (2595 pages).

\* cited by examiner

FRONTHAUL NETWORK UNIT AND METHOD THEREIN FOR SYNCHRONIZATION OVER A FRONTHAUL NETWORK

CROSS REFERENCE TO RELATED APPLICATIONS

This application is a 35 U.S.C. § 371 National Stage of International Patent Application No. PCT/SE2020/050693, filed 2020 Jul. 1.

TECHNICAL FIELD

Embodiments herein relate to synchronization in a wireless communications network. In particular, embodiments herein relate to a fronthaul network unit and a method therein for synchronizing with a second fronthaul network unit across a fronthaul network. Further, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network commonly comprises radio base stations providing radio coverage over at least one respective geographical area forming a cell. This is commonly referred to as a Radio Access Network, RAN. The RAN is in turn connected to the core network in the wireless communications network via a so-called backhaul network. Wireless devices, User Equipments (UEs), mobile stations, and/or wireless terminals, are served in the cells by the respective radio base station and are communicating with respective radio base station in the RAN over an air/radio interface. Commonly, the wireless devices transmit data over the air/radio interface to the radio base stations in uplink, UL, transmissions and the radio base stations transmit data over the air/radio interface to the wireless devices in downlink, DL, transmissions.

A different type of RAN, referred to commonly as a C-RAN, may comprise centralized digital or baseband processing units/nodes serving one or more Radio Frequency, RF, processing units/nodes. The one or more RF processing units may in some cases be standalone remote radio units, such as, e.g. Remote Radio Heads/Units, RRHs/RRUs. In this case, the remote radio units may, for example, be installed at remote cell sites that may be located up to tens of kilometers away from its corresponding digital or baseband processing unit, or be close, but spread out and distributed across an indoor environment to ensure large data traffic capacity. In this type of RAN, a fronthaul network naturally arises because something must connect baseband units/nodes and the radio units/nodes. Today, the fronthaul network may, for example, be a single fiber optics cable connecting each radio unit/node to its corresponding baseband unit/node—the latter may manage several of the former—conventionally using the CPRI protocol stack as described in more detail below. As fronthaul networks will be increasingly used in the future, the baseband and radio units/nodes will increasingly have to compete for the available network bandwidth.

The fronthaul network units in a fronthaul network may be connected via electrical or optical communications links and intermediate network switches. A fronthaul network typically has rather strict latency requirements, such as, typically below 100 µs total latency including propagation delay and any delay in the intermediate network switches. For 2G/3G/4G wireless communications network, the fronthaul part of the RAN has typically been implemented using the Common Public Radio Interface, CPRI. CPRI uses time division multiplexing and has built-in synchronization capabilities. The accuracy of the synchronization of fronthaul network units may be measured via a Timing Alignment Error, TAE. The TAE depends on the type of services supported by the fronthaul network. The most advanced services, such as, e.g. spatial multiplexing or transmit diversity, may require a TAE below ±65 ns, while less advanced services, such as, e.g. LTE Time Division Duplexing, LTE-TDD, may work with a TAE below ±1.5 µs. However, localization features, such as, e.g. Observed Time Difference of Arrival, OTDOA, may introduce even stricter requirement on the TAE.

Recently, a packed-based fronthaul network specification, eCPRI, has been developed to improve scalability for 4G/5G fronthaul networks. This specification suggest IEEE 1588-2008—*IEEE Standard for a Precision Clock Synchronization Protocol for Networked Measurement and Control Systems*, a Precision Time Protocol, PTP, for synchronization of the remote radio units. Using this protocol avoids the need for costly Global Navigation Satellite System, GNSS, receivers in every remote radio unit, which otherwise is a requirement. This also has further advantages since GNSS receivers does not work well for indoor remote radio units.

This PTP protocol, or other similar packet-based synchronization protocols, may be used to synchronize fronthaul network units across a fronthaul network. These protocols rely on exchanging timestamped messages and tracking the deviation between a master or reference clock and a slave clock. In an end-to-end measurement mode, the clock adjustment value in PTP may be derived from timestamps exchanged using these packet-based synchronization messages e.g.:

Sync-message. Transmitted from master unit to slave unit. Multiple Sync-messages may be transmitted prior to a Delay request message.

Follow-up-message. Transmitted from master unit to slave unit. This is an optional message that depends on the hardware timestamping capabilities of the PTP master.

Delay request message. Transmitted from slave to master.

Delay response message. Transmitted from master to slave.

FIG. 1 shows one example of a PTP exchange between a master clock unit and a slave clock unit. Here, the PTP exchange is concluded when the slave clock unit has access to four timestamps ($t_1$, $t_2$, $t_3$, $t_4$). After a Sync message is delivered, the slave clock unit will have $t_1$, $t_2$. $t_3$ is registered when the Delay_req message departs the slave, and $t_4$ will be registered by the master clock unit on receipt of the Delay_req message. The Delay_resp message carries $t_4$ back to the slave. The slave clock unit may then e.g. filter the timestamps in order to recalculate an offset value and discipline its oscillator, i.e. synchronize its clock and frequency information.

One of the main drawbacks in using this type of protocol is Packet Delay Variation, PDV. PDV occurs because the time to traverse the fronthaul network and the network switches therein may vary between the PTP packets. The PDV in a fronthaul network may dependent on a number of factors, such as, for example, the load in the fronthaul network, the number of hops between the baseband processing unit and the radio unit, and the availability of specific fronthaul network features, such as, packet pre-emption. It should also be noted that PDV may occur even if synchronization/timing messages have strictly higher priority in the fronthaul network than fronthaul data packets. This is because, due to store-and-forward operation in e.g. IEEE 802.3-compliant switches, data packets that are already being transmitted in the outbound link are not considered when deciding which data packet should be transmitted next.

One approach to mitigate PDV, and to ensure a suitable performance in the synchronization plane, is to only have PTP-aware network switches in the fronthaul network. PTP-aware network switches may in this case implement a PTP Transparent Clock or a Boundary Clock. However, this significantly increases the costs in the fronthaul network, in particular, for indoor radio communication networks. Another approach to mitigate PDV is to use Time-Sensitive Networking, TSN, features, such as, e.g. packet pre-emption and scheduled traffic. This, however, adds a lot of support requirements from the network equipment, and will also increase the cost of the fronthaul network. It should also be noted that many TSN features require a high level of synchronization as a pre-condition.

A further approach to mitigate PDV is to use so-called controlled packed departure. In controlled packed departure, the gap between sync packets and other traffic is managed in such a way that the sync packets are not heavily affected by queuing effects, and may be implemented using functionality, such as, e.g. source back-off and pause frames in Ethernet. However, the effectiveness of such solutions depends of the support of these features by the underlying hardware. Thus, even in view of the various approaches described above, there is still a need to improve synchronization over the fronthaul network.

SUMMARY

It is an object of embodiments herein to improve synchronization over a fronthaul network.

According to a first aspect of embodiments herein, the object is achieved by a method performed by a first fronthaul network unit for synchronizing with a second fronthaul network unit across a fronthaul network carrying Time-Division Duplex, TDD, radio transmissions. The first fronthaul network unit obtains control information indicating uplink, UL, and downlink, DL, time periods for the TDD radio transmissions over a radio interface. The first fronthaul network unit also obtains local timing information in the first fronthaul network unit indicating the actual timing of the TDD radio transmissions over the fronthaul network. The first fronthaul network unit further determines, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul UL direction. Furthermore, the first fronthaul network unit determines first sets of synchronization messages that has been transferred between the first and second fronthaul network unit within the determined fronthaul DL and UL time intervals, and second sets of synchronization messages that has been transferred between the first and second fronthaul network unit outside the determined fronthaul DL and UL time intervals. Also, the first fronthaul network unit synchronizes, based on the synchronization messages, time and/or frequency information in the first fronthaul network unit depending on which of the first and/or second sets the synchronization messages belongs to.

According to a second aspect of embodiments herein, the object is achieved by a first fronthaul network unit for synchronizing with a second fronthaul network unit across a fronthaul network carrying TDD radio transmissions. The first fronthaul network unit is configured to obtain control information indicating UL and DL time periods for the TDD radio transmissions over a radio interface. The first fronthaul network unit is also configured to obtain local timing information in the first fronthaul network unit indicating the actual timing of the TDD radio transmissions over the fronthaul network. The first fronthaul network unit is further configured to determine, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul DL direction. Furthermore, the first fronthaul network unit is further configured to determine first sets of synchronization messages that has been transferred between the first and second fronthaul network unit within the determined fronthaul DL and UL time intervals, and second sets of synchronization messages that has been transferred between the first and second fronthaul network unit outside the determined fronthaul DL and UL time intervals. Also, the first fronthaul network unit is configured to synchronize, based on the synchronization messages, time and/or frequency information in the first fronthaul network unit depending on which of the first and/or second sets the synchronization messages belongs to.

According to a third aspect of the embodiments herein, a computer program configured to perform the method described above is also provided. Further, according to a fourth aspect of the embodiments herein, carriers configured to carry the computer program configured for performing the method described above are also provided.

By obtaining information indicating UL and DL time periods of TDD radio transmissions and local timing information in the first fronthaul network unit, the first fronthaul network unit is able to derive time intervals for which synchronization messages have a low or high risk of competition with other fronthaul data traffic across the fronthaul network. Hence, based on the derived time intervals, the fronthaul network node is able to process information provided by the synchronization messages according to their susceptibility to delay variation. This will provide more accurate synchronization information at the first fronthaul network unit with which the first fronthaul network unit may synchronize its clock. Thus, synchronization in the first fronthaul network unit and in the fronthaul network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
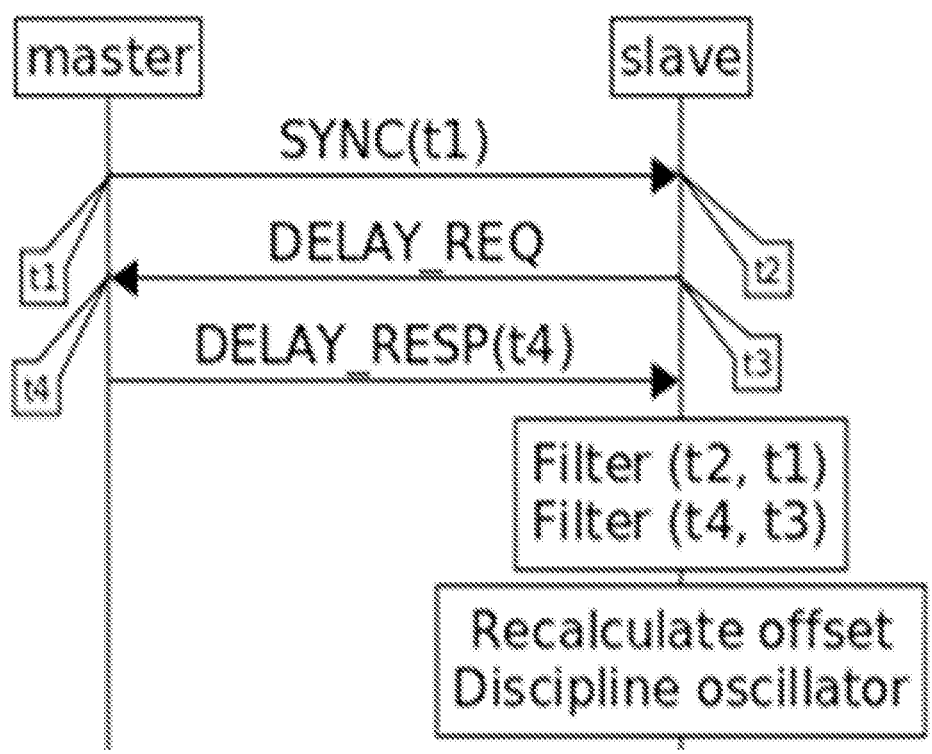
FIG. 1 is a signalling diagram of a PTP exchange between a master clock unit and a slave clock unit in a fronthaul network.

The figures are schematic and simplified for clarity, and they merely show details which are essential to the understanding of the embodiments presented herein, while other details have been left out. Throughout, the same reference numerals are used for identical or corresponding parts or steps.

Figure 2:
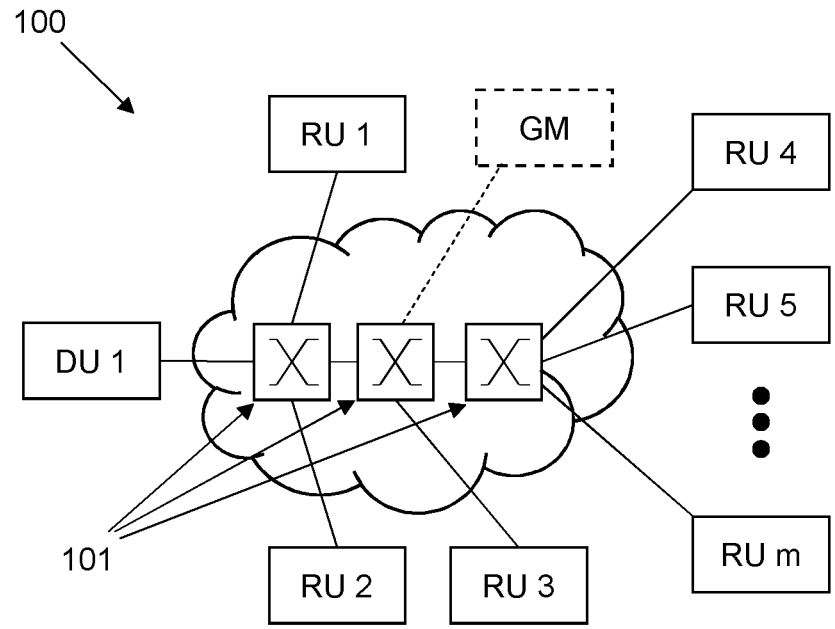
FIG. 2 is a schematic block diagram of a network architecture for a packet-based fronthaul network.
Figure 3:
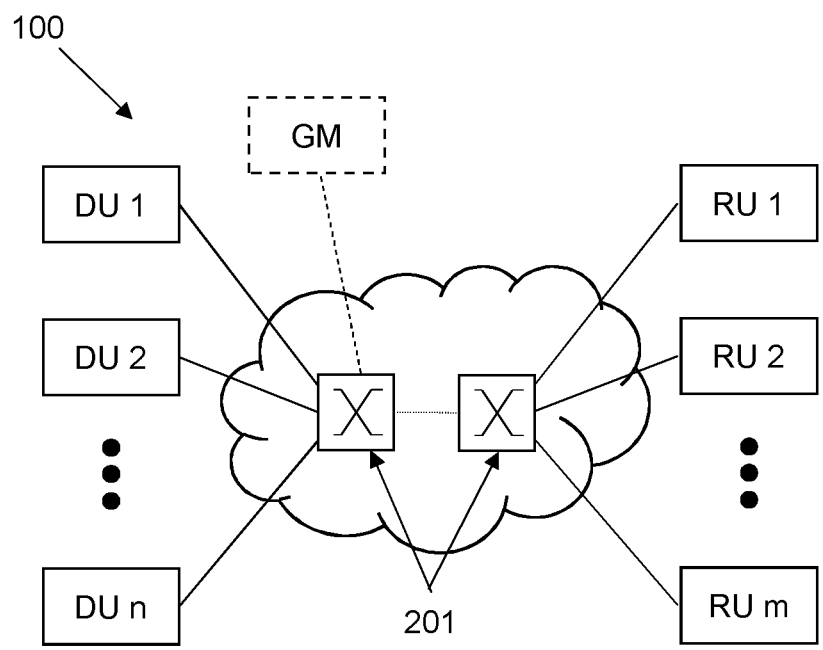
FIG. 3 is another schematic block diagram of a network architecture for a packet-based fronthaul network.

FIGS. 2-3 illustrates examples of simplified network architectures for a fronthaul network 100 in a Radio Access Network, RAN. The topology of the network architecture for the fronthaul network 100 in FIG. 2 may be referred to as a tree-like structure, while the topology of the network architecture for the packet-based fronthaul network 100 in FIG. 3 may be referred to as a dumbbell-like structure. The fronthaul network 100 in FIGS. 2-3 may be any packet-based fronthaul network capable of carrying Time-Division Duplex, TDD, radio transmissions, i.e. this means that the fronthaul network fulfils the delay requirements for serving certain Radio Access Technologies, RATs, configured with TDD radio transmissions. Also, the fronthaul network 100 in FIG. 2-3 may be implemented in a TDD-based RAN, such as, a NR or a LTE-TDD RAN, etc.

Further, the fronthaul network 100 in FIGS. 2-3 may comprise one or more baseband processing units, DU1, DU2, ..., DUn, also referred to in some cases as a Digital Unit, DU. The baseband processing units DU1, DU2, ..., DUn, may be connected to one or more RF processing units, RU1, RU2, ..., RUm, via a number of intermediate fronthaul network switches 101, 201. Here, n and m is an integer depending on suitable deployment in the fronthaul network 100. The baseband processing units, DU1, DU2, ..., DUn, the RF processing units, RU1, RU2, ..., RUm, and the number of intermediate fronthaul network switches 101, 201 may be configured to communicate with each other over electrical or optical communications links in the fronthaul network 100. In some embodiments, the one or more RF processing units, RU1, RU2, ..., RUm may be remote radio units, such as, e.g. RRUs/RRHs. Alternatively, in some embodiments, the one or more RF processing units, RU1, RU2, ..., RUm may be indoor radio units or radio dots in a Radio Dot System, RDS, for an indoor system deployment.

Optionally, a grandmaster synchronization unit, GM, may also be connected to the fronthaul network 100 in FIGS. 2-3. The grandmaster synchronization unit, GM, may, for example, be a separate fronthaul network unit, one of the baseband processing unit, DU1, DU2, ..., DUn or even one of the RF processing units, RU1, RU2, ..., RUm, that has been elected, e.g. via a Best Master Clock Algorithm, BMCA, to be responsible for the timing exchange between the baseband processing units, DU1, DU2, ..., DUn and the RF processing units, RU1, RU2, ..., RUm. Furthermore, although only a few number of intermediate fronthaul network switches are shown in FIGS. 2-3, it should be noted that the number of intermediate fronthaul network switches 101, 201 in between the baseband processing units, DU1, DU2, ..., DUn, and the RF processing units, RU1, RU2, ..., RUm, may be significantly higher.

For the purpose of describing the advantages of the embodiments herein as well as possible, it should be noted that there are no direct communication links described between any of the one or more of the RF processing units, RU1, RU2, ..., RUm, and their corresponding baseband processing unit, DU1, DU2, ..., DUn. Conventionally, in such packet-based fronthaul networks, the intermediate fronthaul network switches 101, 201 will most prominently execute store-and-forward operations such that fronthaul data and control signalling, i.e. including synchronization messages, may traverse the fronthaul network 100. This means that a delay will be introduced in the fronthaul network 100 that is at least partly dependent on the number of hops between the baseband processing units, DU1, DU2, ..., DUn, and the RF processing units, RU1, RU2, ..., RUm. Further, it should also be noted that the use of multiple intermediate fronthaul network switches may be required in the fronthaul network 100, for example, in indoor deployments where the RF processing units RU1, RU2, ..., RUm, are scattered in multiple floor levels. In addition, the intermediate fronthaul network switches 101, 201 may also comprise clocks or built-in uncertainties that may contribute to the overall delay experienced by a data packet, for example, a clock having a high frequency offsets or implementation specific indeterminacies in their switch fabric or forwarding engine, etc. This contribution to the overall delay, however, is normally relatively small in comparison.

However, a significant reason behind the overall delay or PDV in the fronthaul network 100 is that the synchronization messages in the fronthaul network 100 are competing for the same outbound link in each intermediate fronthaul network switch 101, 201 as the ordinary data generated by the baseband processing units, DU1, DU2, ..., DUn in the DL direction and the RF processing units, RU1, RU2, ..., RUm in the UL direction. It may also be noted that even in case each of the RF processing units, RU1, RU2, ..., RUm, and the baseband processing units, DU1, DU2, ..., DUn, comprises GPS modules from which to extract accurate timing, there will always be some level of synchronization due to the TDD system under consideration; that is, different cells must e.g. at least respect their guard times so as to avoid inter-cell interference.

In reference to the embodiments described hereinafter, the term "first fronthaul network unit" may refer to any one of the baseband processing units, DU1, DU2, ..., DUn, or the RF processing units, RU1, RU2, ..., RUm, operating as a slave unit or slave clock unit in respect to a grandmaster synchronization unit, GM, operating as master unit or master clock unit. Also, the term "second fronthaul network unit"

may refer to any fronthaul network unit in the fronthaul network that operates as master unit or master clock unit, such as, the grandmaster synchronization unit, GM. In cases wherein the PTP protocol is used, the "first fronthaul network unit" may also be referred to as a PTP slave, and the "second fronthaul network unit" as a PTP master.

As part of the developing of the embodiments described herein, it has been realized that, when carrying radio content for TDD systems, a fronthaul network exhibits a similar periodic utilization pattern as that of the radio or air interface. For example, in a DL direction, the traffic characteristics generated by multiple baseband processing units may be observed to have a periodicity similar to that of the air radio interface of the remote network units. In other words, the DL traffic in the packet-based fronthaul network shows a TDD pattern where the links essentially are utilized in half-duplex mode even when signals are aggregated. Similar reasoning may also be applied to the UL direction from the remote network units. Thus, since modern 3GPP compliant communications systems, such as, NR and LTE, etc., most likely will be based on a TDD scheme for maximum performance, the dynamic TDD behaviour of the air radio interface will also likely be observed in the fronthaul network interfaces used to implement these systems.

Hence, this dynamic TDD behaviour in the fronthaul network may be exploited to send packet-based synchronization messages, e.g. PTP messages, in periods of low utilization in the fronthaul network. This is described in more detail in PCT/SE2019/051039 by the same applicant, said document hereby incorporated herein by reference, wherein a fronthaul network unit operating as master or GM in the fronthaul network is configured to control the departure of the PTP messages to coincide with moments of low-activity in the fronthaul network, mainly caused by the TDD cycle; that is, the PTP messages may be transmitted in time periods opposing the active transmit direction of the air radio interface. In other words, knowledge of the TDD cycle of the Radio Access Technology, RAT, may be used in the fronthaul network units to select adequate transmit opportunities for PTP messages in the fronthaul network.

However, if the master or GM is not the same as the source of the data traffic, e.g. another baseband processing unit, the master or GM may need to first coordinate the transmissions with the basebands processing unit and the RF processing units. Furthermore, in many RAN deployments today, commercially available GMs are used. These GMs are typically independent components which are not embedded in any of the baseband processing units or RF processing units. In these situations, the incorporation of such an independent GMs means that there is no or severely limited control over the PTP implementation in the fronthaul network, except perhaps from limited configuration parameters.

Therefore, solutions that may be implemented only at the slave units, or PTP slaves, in the fronthaul network may be considered more advantageous to operators of the fronthaul networks. In particular, for example, in a situation where a PTP slave is connected to legacy equipment, e.g. a master timing source from a third party, such as, a third party master unit or GM, in a fronthaul network.

One approach to improve synchronization performance from the side of the slave unit is to implement packet selection. Packet selection may, for example, comprise selecting, from a set of observations, the observation with the minimum amount of delay, calculated over a finite observation window. In other words, selecting, from a window of N observations, the one PTP message with the smallest delay or most frequent delay value. Another approach to improve synchronization performance from the side of the slave unit is to implement packet filtering, whereby the slave unit extracts some derived value from an observation window, such as, e.g. a mean delay, a median delay, a mean time offset, etc. Model-based approaches, such as, e.g. Kalman filters or Least-Squares Estimations, may also be used in the slave unit to complement such filtering techniques, wherein some underlying dynamic of the synchronization system is taken into account in the process of extracting the derived value from the observation window. Unfortunately, one of the main disadvantages common to all approaches based on packet selection or packet filtering at the slave unit is the fact that the operator of the fronthaul network may have no control of the rate or instants when the PTP messages are sent by the master unit or GM. In general, the slave unit has no control or even knowledge about the other data traffic in the fronthaul network. This leads to solutions that are limited to operating over statistics of the delay distribution, but not being able to alter it.

Independent of the statistic chosen in a packet selection or filtering process at the slave unit, it has also been realized that it is always advantageous to reduce the variance in the delay distribution, since this leads to better performance for the PTP frequency, time and phase tracking performed by the slave clock. At least partially based on this information, an improved packet filtering approach for a first fronthaul network unit, e.g. operating as PTP slave in a fronthaul network, is presented by embodiments described herein. Namely, by obtaining information indicating UL and DL time periods of TDD radio transmissions and local timing information in a first fronthaul network unit, a first fronthaul network unit is able to derive time intervals for which synchronization messages have a low or high risk of competition with other fronthaul data traffic across the fronthaul network. Hence, based on these derived time intervals, the fronthaul network node is able to process timing information (e.g. one-way delay observations) provided by the synchronization messages according to their susceptibility to delay variation, i.e. depending on which of the first and/or second sets synchronization messages belongs to. This will provide more accurate synchronization information at the first fronthaul network unit with which the first fronthaul network unit may synchronize its clock. Thus, synchronization in the first fronthaul network unit and in the fronthaul network will be improved.

An additional advantage is that the embodiments described herein may be implemented for any fronthaul connected network unit acting as a PTP slave, such as, any baseband processing unit or RF processing unit, e.g. remote radio unit, RF node, radio dot system entity, etc. Also, the improved synchronization performance may be achieved without requiring any changes to any fronthaul standard or GM implementation, and when using non-PTP aware switches in the fronthaul network.

Figure 4:
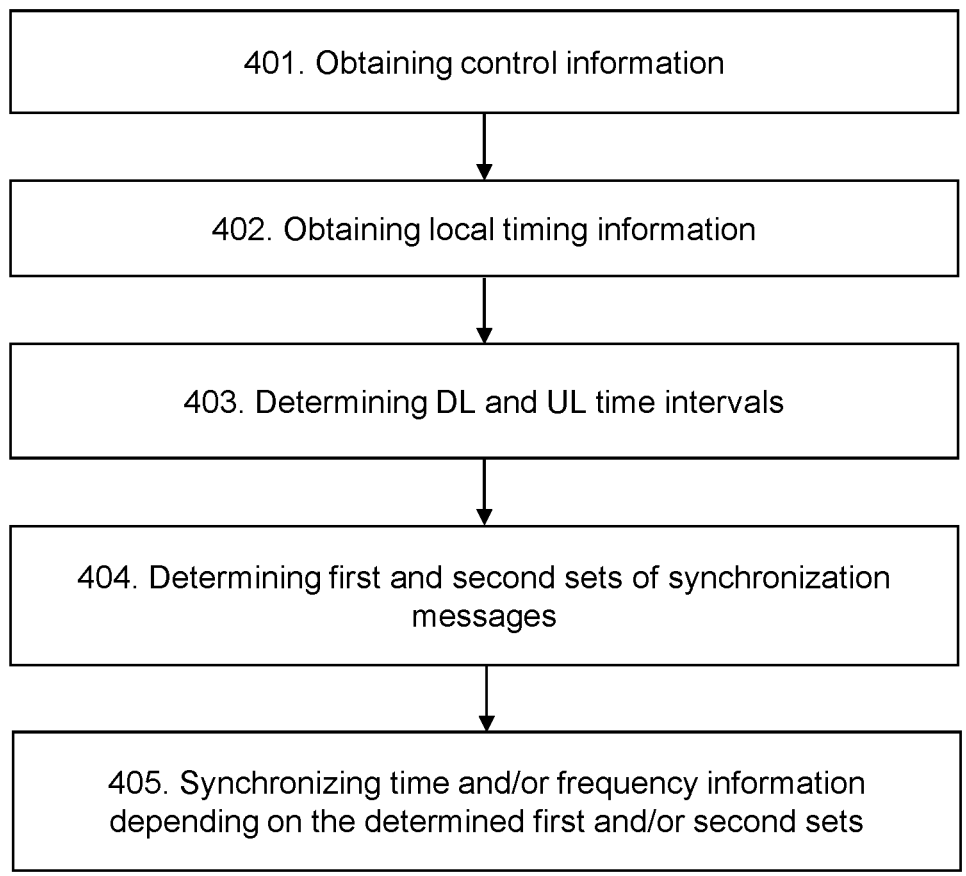
FIG. 4 is a flowchart depicting embodiments of a method in a fronthaul network unit.

Examples of embodiments of a method performed by a first fronthaul network unit RU1, RU2, . . . , RUm; DU1, DU2, . . . , DUn for synchronizing with a second fronthaul network unit GM; DU1, DU2, . . . , DUn across a fronthaul network 100 carrying Time-Division Duplex, TDD, radio transmissions, will now be described with reference to the flowchart depicted in FIG. 4. FIG. 4 is an illustrated example of actions or operations which may be taken by the first fronthaul network unit RU1, RU2, . . . , RUm; DU1, DU2, . . . , DUn in the fronthaul network 100. It should be noted that, in accordance with some embodiments, the first fronthaul network unit RU1, RU2, . . . , RUm; DU1, DU2, . . . , DUn may be any type of fronthaul network unit acting as a slave unit in regards to synchronization of its time and frequency information. For example, the first fronthaul network unit may, in some embodiments, be any one of a Radio Frequency, RF, processing unit RU1, RU2, ..., RUm or a baseband processing unit DU1, DU2, ..., DUn. The method may comprise the following actions.

Action 401

The first fronthaul network unit RU1, RU2, ..., RUm; DU1, DU2, ..., DUn obtains control information indicating uplink, UL, and downlink, DL, time periods for the TDD radio transmissions over a radio interface. This enables information regarding the timing of communications in the fronthaul network 100 corresponding to the TDD behaviour of the radio communications over the radio interface of the fronthaul network unit RU1, RU2, ..., RUm; DU1, DU2, ..., DUn in the fronthaul network 100 to be derived by the first fronthaul network unit RU1, RU2, ..., RUm; DU1, DU2, ..., DUn.

In some embodiments, the obtained control information may comprise one or more of: time slot format sequence information for the radio interface (such as, e.g. NR slot format in use). TDD configuration information for the radio interface (such as, e.g. LTE-TDD subframe configuration information); and control information indicating points in time where a switch between UL and DL transmissions over the radio interface (such as, e.g. explicit notification in the fronthaul control plane traffic of a TDD transmit direction change or switch). This means that, according to one example, the obtained control information may indicate a NR slot format sequence, such as, e.g. DDDSU (i.e. a sequence of three downlink slots, followed by a slot where a transmit direction switch occurs and an uplink slot). Here, the obtained control information may also comprise the slot format number for each of the slots in the sequence. According to a further example, this means that the obtained control information may indicate the TDD configuration for an LTE-TDD system, such as, e.g. configuration 2, DL:UL 4:1.

In yet another example, this means that the obtained control information may indicating a time where the TDD DL-UL or UL-DL switch point is. The control information may be set relative to a frame or slot start time point or another arbitrary reference point. Here, the obtained control information may be provided by in a control message from the second fronthaul network unit GM; DU1, DU2, ..., DUn. For example, periodic control messages may be transmitted comprising detailed information about when, inside a subframe or if ever, a DL-UL or UL-DL switch may occur. This may also apply to both CPRI or eCPRI which may carry this type of message in some form. Another example of such a control message may be a TDD switch point message. Here, the TDD switch point message may, for example, carry information about whether the switch is a DL-UL or a UL-DL, as well as, a timestamp in units of a sample period with the beginning of a radio frame taken as time 0. In this case, it should be noted that this is not the HW timestamp that the PHY layer adds, but rather an indication of when (e.g. in "presentation time" or "air time") the switch will occur.

According to some embodiments, the fronthaul network 100 is full-duplex. This means that fronthaul data and control signalling, i.e. including packet-based synchronization messages, may be simultaneously transmitted in the UL and DL direction across the fronthaul network 100. Also, in some embodiments, the packet-based synchronization messages used in the fronthaul network 100 are timestamped data packets according to a packet-based synchronization protocol. For example, the packet-based synchronization messages may be synchronization messages as defined in the Precision Time Protocol, PTP, such as, sync-, follow-up-, delay request- or delay response messages.

Action 402

In conjunction with the obtaining of the control information in Action 401, the fronthaul network unit RU1, RU2, ..., RUm; DU1, DU2, ..., DUn also obtains local timing information in the first fronthaul network unit indicating the actual timing of the TDD radio transmissions over the fronthaul network 100. The local observation of this timing information allows the first fronthaul network unit RU1, RU2, ..., RUm; DU1, DU2, ..., DUn to, for example, accurately position a synchronization message in a received synchronization message streams from the second fronthaul network unit GM; DU1, DU2, ..., DUN and achieve more specific real-time timing information for the synchronization messages. For example, once the first fronthaul network unit RU1, RU2, ..., RUm; DU1, DU2, ..., DUn has obtained the control information in Action 401, e.g. that DL radio transmissions are due every 5 ms (e.g. with a DDDSU scheme), the first fronthaul network unit RU1, RU2, ..., RUm; DU1, DU2, ..., DUn may still need to determine how much time there is from now, e.g. as given by the local clock time value, until the start of the DL radio transmission.

In some embodiments, the obtained local timing information may comprise one or more of: a local clock time value (e.g. a current value of an Real-Time Clock, RTC); a local I/Q sample count; a timing strobe indicating a frame or slot start; a sample, slot, subframe or frame counter for incoming data-packets over the fronthaul network 100; a first symbol indicator for incoming data-packets over the fronthaul network 100. The obtained information used by the first fronthaul network unit RU1, RU2, ..., RUm; DU1, DU2, ..., DUn may depend on which kind of information is most efficient to use for a specific implementation or situation.

Action 403

As the control information and local timing information has been obtained in Actions 401-402, the first fronthaul network unit RU1, RU2, ..., RUm; DU1, DU2, ..., DUn determines, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul UL direction. This means that the first fronthaul network unit RU1, RU2, ..., RUm; DU1, DU2, ..., DUn derives information regarding the timing of communications in the fronthaul network 100 corresponding to the TDD behaviour of the radio communications over the radio interface of the first fronthaul network unit RU1, RU2, ..., RUm; DU1, DU2, ..., DUn. In other words, the first fronthaul network unit RU1, RU2, ..., RUm; DU1, DU2, ..., DUn determines time intervals for which synchronization messages have a lower and higher risk of competition with other fronthaul data traffic across the fronthaul network compared with each other.

Figure 5:
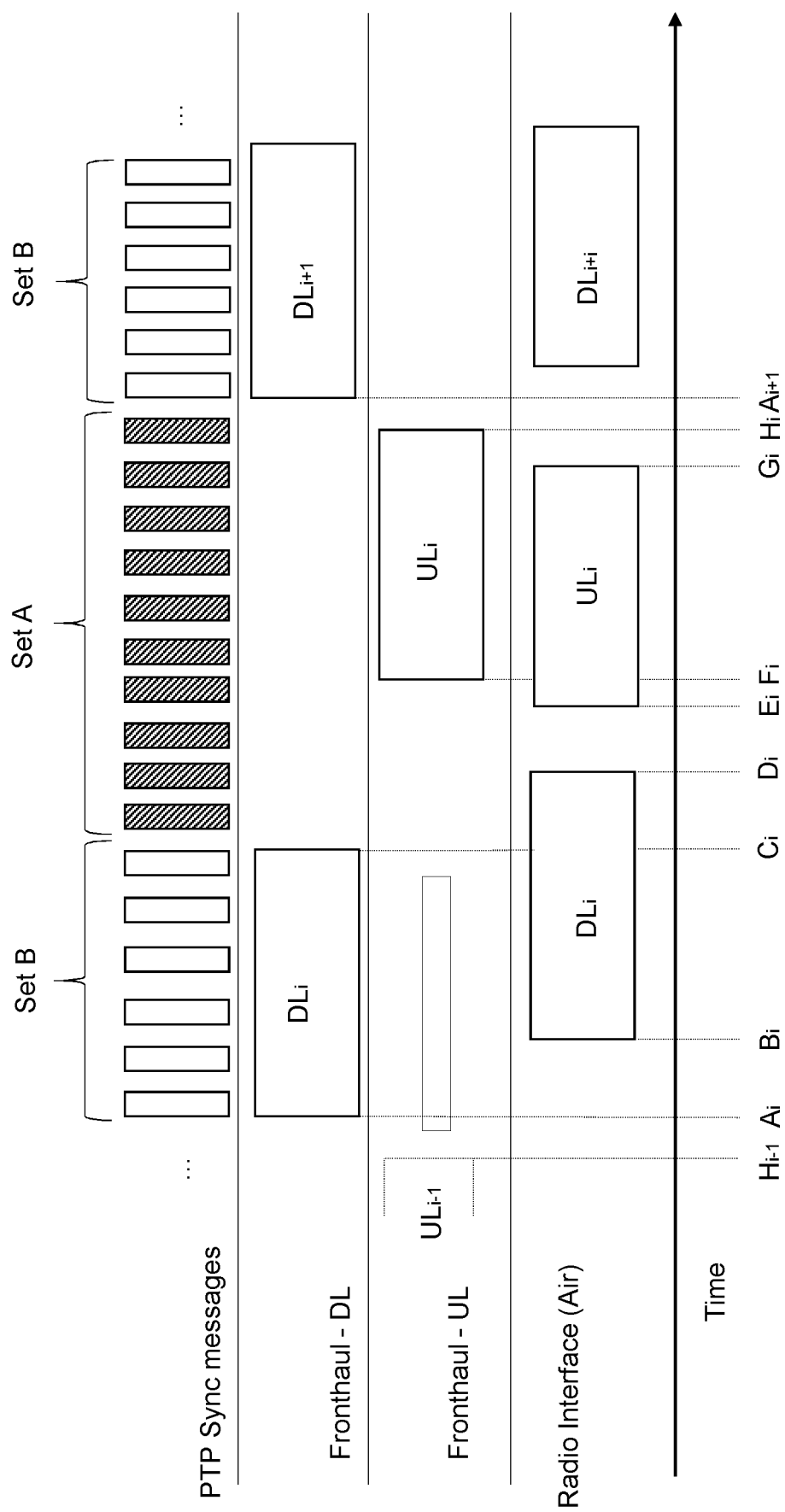
FIG. 5 is a schematic illustration of signalling according to embodiments of a network entity.
Figure 6:
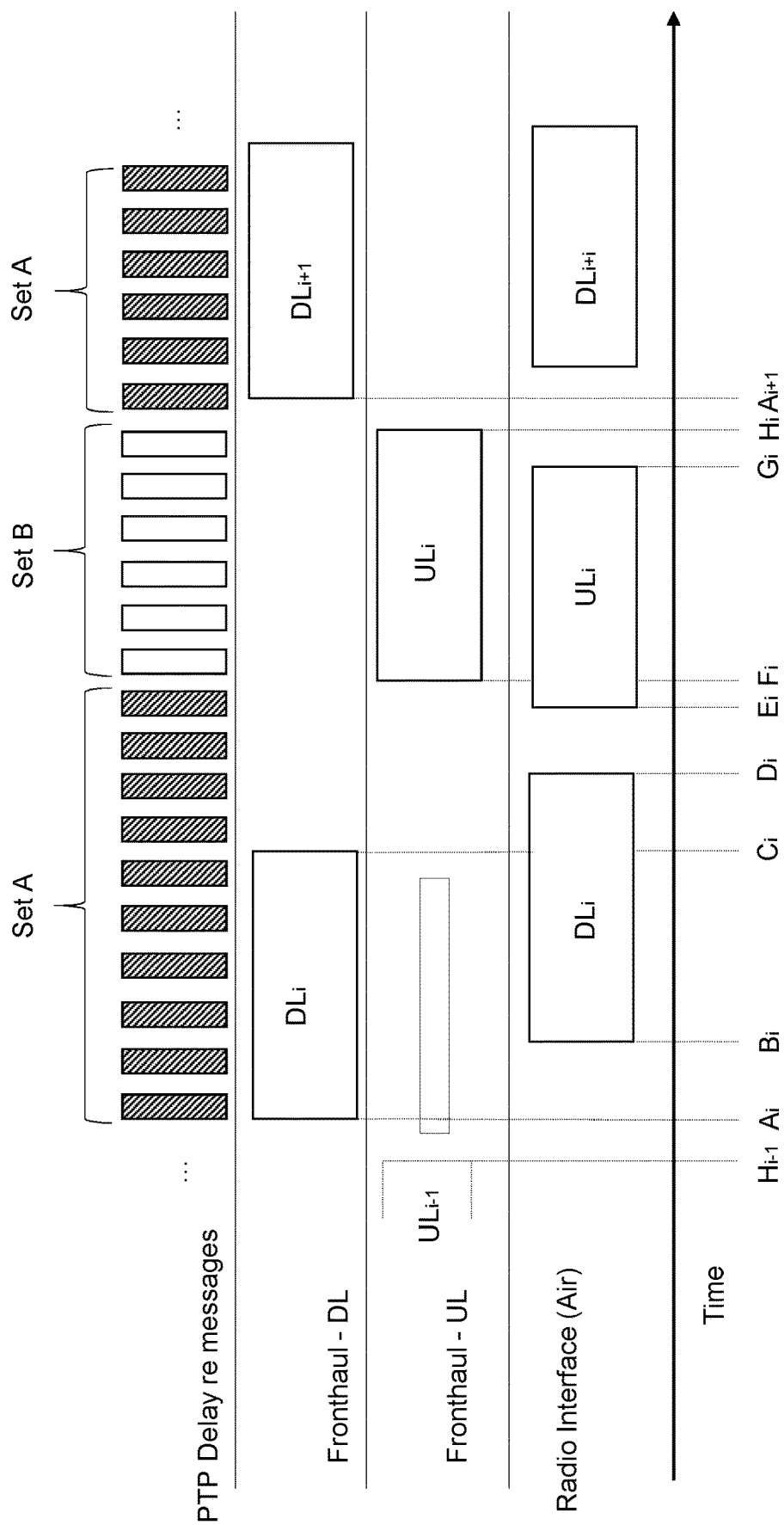
FIG. 6 is another schematic illustration of signalling according to embodiments of a network entity.

This is exemplified in FIGS. 5-6. In the examples in FIGS. 5-6, the timing of signaling in both the UL and DL transmit directions is illustrated, but also the timing of the signalling on the radio interface. A series of time instances are referenced in FIGS. 5-6, wherein the subscript i is used to denote the i-th time instance:

Time instance A denotes the start of DL slot transmission on the fronthaul network interface of the second fronthaul network unit GM, DU1, DU2, . . . , DUn;

Time instance B denotes the start of DL slot transmission on the RF processing unit's antenna, i.e. over the radio interface. This means that the time difference between time instance B and time instance A covers the time period that the data packets take to traverse the fronthaul network 100 plus the processing time at the first fronthaul network unit RU1, RU2, . . . , RUm; DU1, DU2, . . . , DUn;

Time instance C denotes the end of the DL slot transmission on the fronthaul network interface of the second fronthaul network unit GM, DU1, DU2, . . . , DUn. This means that the time difference between time instance C and time instance A covers the DL slot duration in the fronthaul network 100. This duration may differ compared with the DL slot duration over the radio interface because of, e.g. transmission of beamforming weights and other control information between the second fronthaul network unit GM, DU1, DU2, . . . , DUn and the first fronthaul network unit RU1, RU2, . . . , RUm; DU1, DU2, . . . , DUn. The latter may occur when having certain functional splits between the second fronthaul network unit GM, DU1, DU2, . . . , DUn and the first fronthaul network unit RU1, RU2, . . . , RUm; DU1, DU2, . . . , DUn;

Time instance D denotes the end of DL slot transmission via the antenna of the first fronthaul network unit RU1, RU2, . . . , RUm; DU1, DU2, . . . , DUn, i.e. over its radio interface. This means that the time difference between time instance D and time instance B covers the duration of a DL slot on the radio interface. This duration may be influenced by the number of OFDM symbols that are active in a slot and is controlled by the scheduler. The maximum slot duration is defined by the numerology configuration;

Time instance E denoted the start of uplink reception via the antenna of the first fronthaul network unit RU1, RU2, . . . , RUm; DU1, DU2, . . . , DUn, i.e. over its radio interface. This means that the time difference between time instance E and time instance D covers the guard period between DL and UL slots;

Time instance F denotes the start of UL slot transmission over the fronthaul network interface of the first fronthaul network unit RU1, RU2, . . . , RUm; DU1, DU2, . . . , DUn. This means that the time difference between time instance F and time instance E covers the processing time of the first fronthaul network unit RU1, RU2, . . . , RUm; DU1, DU2, . . . , DUn;

Time instance G denotes the end of UL slot reception via the antenna of the first fronthaul network unit RU1, RU2, . . . , RUm; DU1, DU2, . . . , DUn, i.e. over its radio interface. The time instance G is influenced by the number of active OFDM symbols in an UL slot as controlled by the scheduler. The maximum slot duration is defined by the numerology configuration;

Time instance H denotes the end of UL slot transmission over the fronthaul network interface of the first fronthaul network unit RU1, RU2, . . . , RUm; DU1, DU2, . . . , DUn. This means that the time difference between time instance H and time instance F covers the UL uplink slot duration in the fronthaul network 100. Also, this duration may differ compared with the UL slot duration over the radio interface because of, e.g. transmission of channel estimates and other control information between the second fronthaul network unit GM, DU1, DU2, . . . , DUn and the first fronthaul network unit RU1, RU2, . . . , RUm; DU1, DU2, . . . , DUn. The latter may occur when having certain functional splits between the second fronthaul network unit GM, DU1, DU2, . . . , DUn and the first fronthaul network unit RU1, RU2, . . . , RUm; DU1, DU2, . . . , DUn.

Hence, FIGS. 5-6 shows schematic illustrations presenting an example of time intervals, such as, e.g. C, to $A_{i+1}$ for DL and $H_{i-1}$ to $F_i$ for UL, in which packet-based synchronization messages in the fronthaul network 100, such as, e.g. PTP Sync messages or PTP Delay_Req messages, respectively, may be transmitted in the DL/UL direction with lower competition in the fronthaul network 100 from other fronthaul data traffic.

Action 404

After the first fronthaul network unit RU1, RU2, . . . , RUm; DU1, DU2, . . . , DUn has determined the time intervals in Action 403, the first fronthaul network unit RU1, RU2, . . . , RUm; DU1, DU2, . . . , DUn determines first sets $\mathcal{A}_w^{ms}$, $\mathcal{A}_w^{sm}$ of synchronization messages that has been transferred between the first and second fronthaul network unit within the determined fronthaul DL and UL time intervals, and second sets $\mathcal{B}_w^{ms}$, $\mathcal{B}_w^{sm}$ of synchronization messages that has been transferred between the first and second fronthaul network unit outside the determined fronthaul DL and UL time intervals. This means that the first fronthaul network unit RU1, RU2, . . . , RUm; DU1, DU2, . . . , DUn may determine which synchronization messages that are received during a time of lower risk of competition with other fronthaul data traffic across the fronthaul network, and determine which synchronization messages that are received during a time of higher risk of competition with other fronthaul data traffic across the fronthaul network; then, the first fronthaul network unit RU1, RU2, . . . , RUm; DU1, DU2, . . . , DUn groups the synchronization message in different sets accordingly. In other words, the first fronthaul network unit RU1, RU2, . . . , RUm; DU1, DU2, . . . , DUn, operating a PTP slave clock may, for example, classify the PTP messages in relation to the determined fronthaul DL and UL time intervals.

This is also exemplified in FIGS. 5-6. As illustrated in FIGS. 5, a synchronization message transmitted from the second fronthaul network unit GM; DU1, DU2, . . . , DUN, such as, e.g. PTP Sync-messages, that is received by the first fronthaul network unit RU1, RU2, . . . , RUm; DU1, DU2, . . . , DUn, in any of the dashed transmit opportunities in FIG. 5 may be determined to be comprised in a first set A of synchronization messages, i.e. $\mathcal{A}_w^{ms}$. Correspondingly, a synchronization message transmitted from the second fronthaul network unit GM; DU1, DU2, . . . , DUN, such as, e.g. PTP Sync-messages, that is received by the first fronthaul network unit RU1, RU2, . . . , RUm; DU1, DU2, . . . , DUn, in any of the non-dashed transmit opportunities in FIG. 5 may be determined to be comprised in a second set B of synchronization messages, i.e. $\mathcal{B}_w^{ms}$. Accordingly, the first set A indicates synchronization messages that would experience low downlink competition in the network, while Set B indicates synchronization messages that would experience higher downlink competition.

In a similar fashion and as illustrated in FIG. 6, a synchronization message to the second fronthaul network unit GM; DU1, DU2, . . . , DUN, such as, e.g. PTP Delay_Req-messages, that is transmitted from the first fronthaul network unit RU1, RU2, . . . , RUm; DU1, DU2, . . . , DUn in any of the dashed transmit opportunities in FIG. 6 may be determined to be comprised in a first set A of synchronization messages, i.e. $\mathcal{A}_w^{sm}$. Correspondingly, a synchronization message to the second fronthaul network unit GM; DU1, DU2, . . . , DUN, such as, e.g. PTP Delay_Req-messages, that is transmitted from the first fronthaul network unit RU1, RU2, . . . , RUm; DU1, DU2, . . . , DUn in any of the non-dashed transmit opportunities in FIG. 6 may be determined to be comprised in a second set B of synchronization messages, i.e. $\mathcal{B}_w^{sm}$. Accordingly, the first set A indicates synchronization messages that would experience low uplink competition in the network, while Set B indicates synchronization messages that would experience higher uplink competition.

The superscripts ms and sm for the first and second sets of synchronization messages $\mathcal{A}_w^{ms}$, $\mathcal{A}_w^{sm}$, $\mathcal{B}_w^{ms}$, $\mathcal{B}_w^{sm}$ here denotes the master-to-slave and slave-to-master directions, while w denotes an observation window during which synchronization messages are received. It should also be noted that even though about 16 transmit opportunities for synchronization messages per transmission pattern as depicted in the FIGS. 5-6 is a realistic number, this is merely made for illustrative purposes and should not be considered limiting since the illustrations in FIGS. 5-6 are not drawn to scale.

Hence, as an example, a single two-way exchange as depicted in FIG. 1 may therefore have a PTP Sync message from either set A or B, and a PTP Delay_Req message from either set A or B as well, yielding four possible "labels" for the exchange, i.e. AA, AB, BA, BB.

Action 405

After determining the different sets of synchronization messages in Action 404, the first fronthaul network unit RU1, RU2, . . . , RUm; DU1, DU2, . . . , DUn synchronizes, based on the synchronization messages, time and/or frequency information in the first fronthaul network unit depending on which of the first and/or second sets $\mathcal{A}_w^{ms}$, $\mathcal{A}_w^{sm}$, $\mathcal{B}_w^{ms}$, $\mathcal{B}_w^{sm}$ the synchronization messages belongs to. This allows the first fronthaul network unit RU1, RU2, . . . , RUm; DU1, DU2, . . . , DUn to process information provided by the synchronization messages in accordance with the susceptibility to delay variation of the synchronization messages. By taking this into respect when synchronizing the time and/or frequency information in the first fronthaul network unit RU1, RU2, . . . , RUm; DU1, DU2, . . . , DUn, i.e. disciplining the slave clock in the first fronthaul network unit RU1, RU2, . . . , RUm; DU1, DU2, . . . , DUn, the performance of the synchronization in the first fronthaul network unit RU1, RU2, . . . , RUm; DU1, DU2, . . . , DUn, and thus also in the fronthaul network 100, will be improved.

In some embodiments, the first fronthaul network unit RU1, RU2, . . . , RUm; DU1, DU2, . . . , DUn may perform the synchronization of the time and/or frequency information based on synchronization messages that belongs to the first sets $\mathcal{A}_w^{ms}$, $\mathcal{A}_w^{sm}$ of synchronization messages. This means that the first fronthaul network unit RU1, RU2, . . . , RUm; DU1, DU2, . . . , DUn may synchronize the time and/or frequency information using a set of synchronization message that provide a comparatively low delay variation among its delay observations as compared to using each of the synchronization messages received.

In some embodiments, the first fronthaul network unit RU1, RU2, . . . , RUm; DU1, DU2, . . . , DUn may perform the synchronization of the time and/or frequency information based on a time offset $\hat{x}$ that is estimated using the synchronization messages that belongs to the first sets $\mathcal{A}_w^{ms}$, $\mathcal{A}_w^{sm}$ of synchronization messages. If, for example, only AA exchanges are considered, that is, two-way exchanges wherein both the PTP Sync message belong to set $\mathcal{A}_w^{ms}$ and the PTP Delay_Req message belong to set $\mathcal{A}_w^{sm}$, then the time offset $\hat{x}$ may, for example, be estimated for each observation window w according to Eq. 1:

$$\hat{x} = \frac{1}{2|\mathcal{A}_w|}\sum_{\mathcal{A}_w}(d_{ms} - d_{sm}) \quad \text{(Eq. 1)}$$

where $d_{ms}=t_2-t_1$ and $d_{sm}=t_4-t_3$ are the one-way delays and the summation is carried over the exchanges in set $\mathcal{A}_w$, i.e. all AA exchanges, wherein $|\mathcal{A}_w|$ is the cardinality of this set.

In this case, the first fronthaul network unit RU1, RU2, . . . , RUm; DU1, may optionally estimate the time offset z based on a calculation using one or more time delays in the fronthaul network 100 for synchronization messages that belongs to the first sets $\mathcal{A}_w^{ms}$, $\mathcal{A}_w^{sm}$ of synchronization messages. According to one example, this may be performed by disregarding all synchronization messages belonging to Set B for each direction and only considering the synchronization messages belonging to Set A for each direction, that is, estimating the time offset z for each observation window w according to Eq. 2:

$$\hat{x} = \frac{1}{2|\mathcal{A}_w^{ms}|}\sum_{\mathcal{A}_w^{ms}}d_{ms} - \frac{1}{2|\mathcal{A}_w^{sm}|}\sum_{\mathcal{A}_w^{sm}}d_{sm} \quad \text{(Eq. 2)}$$

According to some embodiments, the first fronthaul network unit RU1, RU2, . . . , RUm; DU1, DU2, . . . , DUn may further perform the synchronization of the time and/or frequency information based on one or more synchronization messages that belongs to the second sets $\mathcal{B}_w^{ms}$, $\mathcal{B}_w^{sm}$ of synchronization messages. In this case, the first fronthaul network unit RU1, RU2, . . . , RUm; DU1, DU2, . . . , DUn may use synchronization messages from the different sets, but take into account the knowledge that the synchronization messages from the different sets may have significantly varying delay variations compared to one another. In some embodiments, the first fronthaul network unit RU1, RU2, . . . , RUm; DU1, DU2, . . . , DUn may perform the synchronization of the time and/or frequency information based on synchronization messages that belongs to both the first and second sets $\mathcal{A}_w^{ms}$, $\mathcal{A}_w^{sm}$, $\mathcal{B}_w^{ms}$, $\mathcal{B}_w^{sm}$ of synchronization messages by filtering the synchronization messages using a model-based filter, wherein the model-based filter is adapted to the difference in delay variance between the one or more synchronization messages that belongs to the second sets $\mathcal{B}_w^{ms}$, $\mathcal{B}_w^{sm}$ of synchronization messages and the synchronization messages that belongs to the first sets, $\mathcal{A}_w^{ms}$, $\mathcal{A}_w^{sm}$ of synchronization messages. This means, for example, that the four possible "labels" for a PTP exchange, i.e. AA, AB, BA, BB, may be used in designing a model-based filter. Here, the membership of the synchronization messages to the different sets A and B may, for example, be used to specify a regressor matrix and noise co-variance properties of the synchronization messages in a least-square formulation that may be used by the model-filter.

Here, it should also be noted that when referring to filtering the synchronization messages, it is the timestamps of the synchronization messages that is mainly considered. For example, as illustrated in FIG. 1, at the end of a PTP exchange (or a series of PTP exchanges), the slave, i.e. the first fronthaul network unit RU1, RU2, . . . , RUm; DU1, DU2, . . . , DUn, has access to four timestamps $t_1$, $t_2$, $t_3$, $t_4$ (or sets of said timestamps). The embodiments outlined above for filtering the synchronization messages may be used by the first fronthaul network unit RU1, RU2, . . . , RUm; DU1, DU2, . . . , DUn in both directions to, for example, obtain good master-to-slave and slave-to-master delay estimates. This may be performed prior to, for example, estimating a time offset adjustment.

Furthermore, in some embodiments, the first fronthaul network unit RU1, RU2, . . . , RUm; DU1, DU2, . . . , DUn may perform the synchronization of the time and/or frequency information by updating a Real-Time Clock, RTC, in the first fronthaul network unit. This means that the first fronthaul network unit RU1, RU2, . . . , RUm; DU1, DU2, . . . , DUn updates its local clock, i.e. its PTP slave clock. Although some embodiments herein refer to time offset estimation, it may easily be applied to other synchronization issues, such as, e.g. frequency offset estimation.

Figure 7:
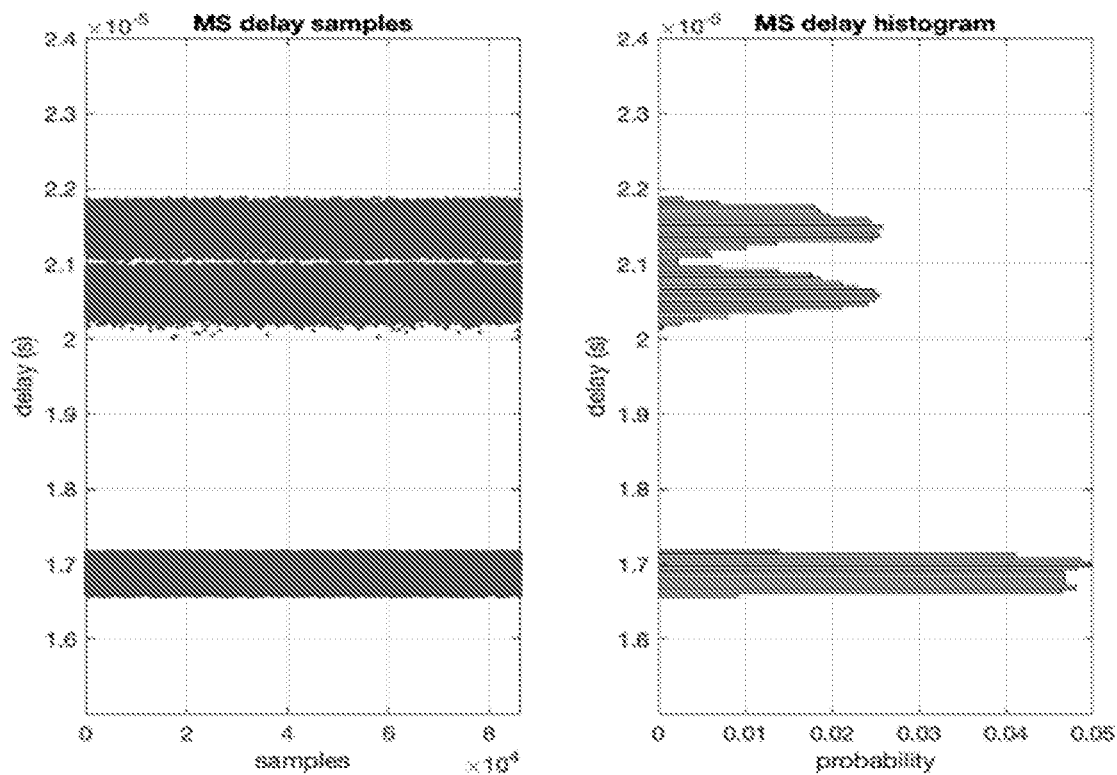
FIG. 7 is a plot diagram indicating measurements of one-way delays from a master clock unit to a slave clock unit in a fronthaul network.
Figure 8:
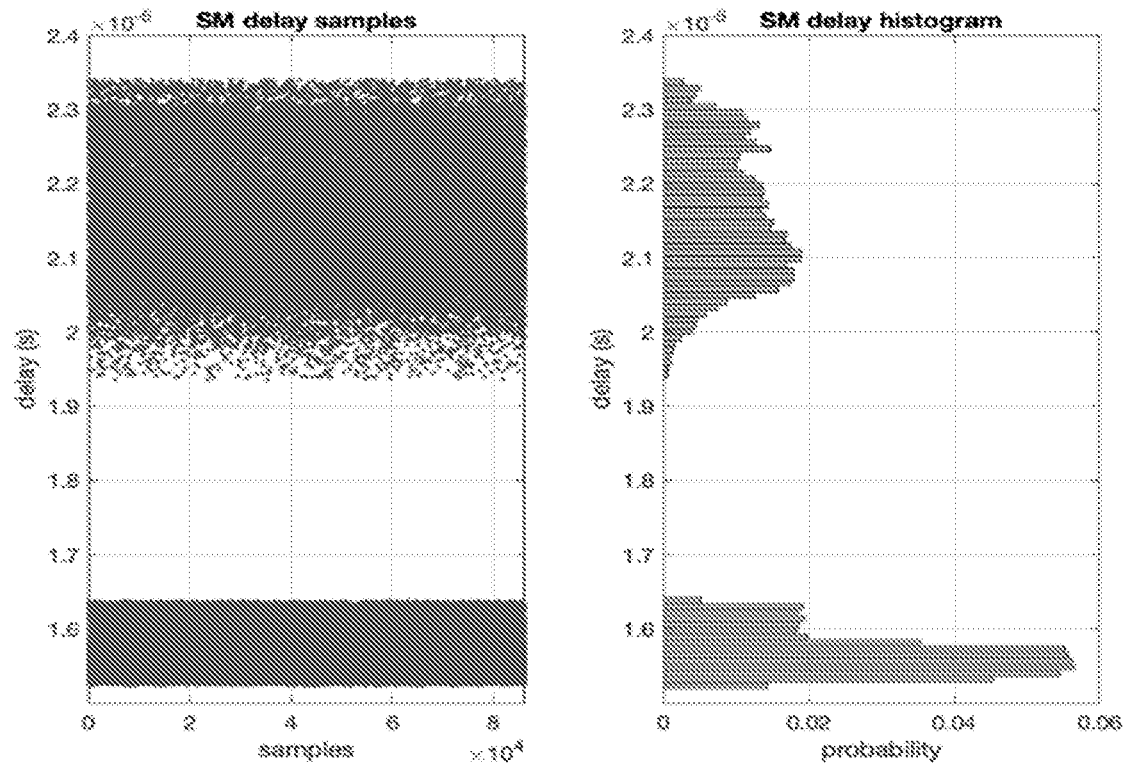
FIG. 8 is another plot diagram indicating measurements of one-way delays from a slave clock unit to a master clock unit in a fronthaul network.

FIG. 7 shows a plot diagram indicating measurements of one-way delays from a master clock unit, such as, the second fronthaul network unit GM; DU1, DU2, . . . , DUN, to a slave clock unit, such as, the first fronthaul network unit RU1, RU2, . . . , RUm; DU1, DU2, . . . , DU, that may occur in a fronthaul network 100. Similarly, FIG. 8 shows a plot diagram indicating measurements of one-way delays from a slave clock unit, such as, the first fronthaul network unit RU1, RU2, . . . , RUm; DU1, DU2, . . . , DU, to a master clock unit, such as, the second fronthaul network unit GM; DU1, DU2, . . . , DUN, that may occur in a fronthaul network 100. These diagrams illustrate some of the characteristics of a fronthaul network 100 that is advantageously made use of by the embodiments described herein. In FIGS. 7-8, a scatter of plot samples is shown on the left and a histogram of the data is shown to the right.

From the left and right plot samples and histograms in FIG. 7-8, it is clear that distinct queueing patterns may be perceived. This is due to the alternating usage of the fronthaul network 100. Furthermore, in FIG. 7, it may be seen that there are two regions with different mean and variances, i.e. low competition in the DL vs. high competition in the DL. Also in FIG. 8, there are two regions with different mean and variances, i.e. low competition in the UL vs. high competition in the UL. Here, it may also be noted that the means and variances are higher than in the DL case shown in FIG. 7. For FIGS. 7-8, it should be noted that the dataset was obtained over a four-hop tree topology, i.e. the first switch is connected to one baseband node, e.g. DU1 in FIG. 2, while the last is connected to two RF nodes or units, e.g. RU4 and RU5 in FIG. 2. During UL, the two RF nodes compete for the outbound link in the last switch. Here, the intermediate switches were not configured to prioritize sync traffic, therefore queueing delays may be substantial. All links are 1 Gbps Ethernet, carrying TDD fronthaul traffic besides PTP packets. Further, the statistics of both low and high competition portions of the TDD cycle were calculated on the measured data, and later used to generate noise samples in the simulations, i.e. Gaussian noise with different mean and variances.

Figure 9:
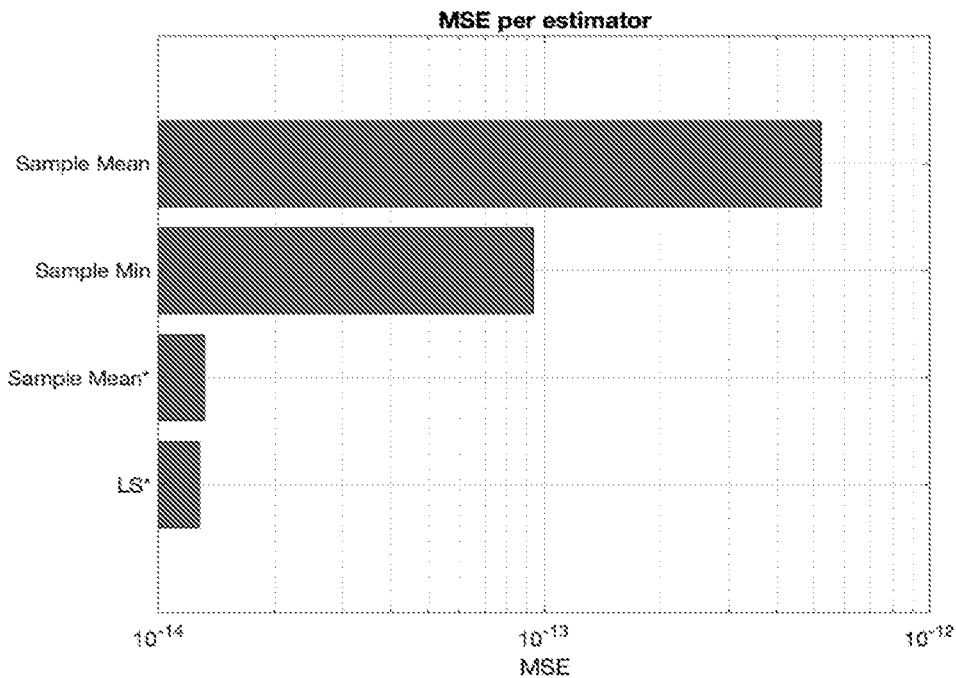
FIG. 9 is a diagram indicating time offset estimation performance according to some embodiments.

FIG. 9 shows a diagram indicating time offset estimation performance in terms of Mean-Squared Error, MSE, of different time offset estimators using simulations based on the measurements referred to in FIGS. 7-8. The uppermost time offset estimator in FIG. 9 uses a sample mean (calculating the average delay in each direction) which takes all synchronization messages into account, while the time offset estimator below the uppermost time offset estimator in FIG. 9 uses a sample minimum (calculating the smallest observed delay asymmetry) which takes all synchronization messages into account.

The two remaining time offset estimators shown in FIG. 9 (denoted with a *) represent estimators according to embodiments herein. The uppermost of these time offset estimators uses a sample mean that calculates the average delay in each direction only over PTP exchanges in which both synchronization messages belong to set A. The other time offset estimator is a Least Squares, LS, time offset estimator where the matrix for each direction is derived from the set membership of the synchronization messages, as described in some embodiments above. Thus, FIG. 9 illustrates some of the advantages of the embodiments described herein by indicating that labelling the messages and taking the labels into consideration when performing packet filtering according to the embodiments described herein will lead to improved time offset estimation performance.

For the time offset estimation performance in FIG. 9, some simulation assumptions where made, such as, e.g. correct labelling of each PTP message into Set A or Set B, 128 PTP messages/second in each direction are transmitted, the time offset estimators all operate in batches of 128 synchronization messages, and no side traffic (TDD) information is considered by some of the time offset estimators, etc.

Figure 10:
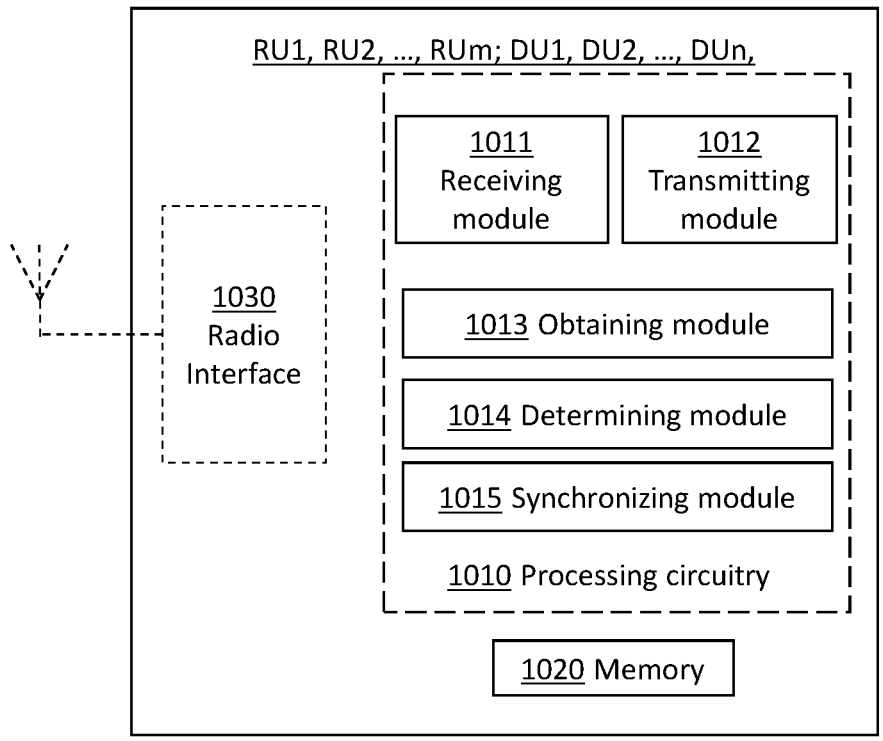
FIG. 10 is a block diagram depicting embodiments of a fronthaul network unit.

To perform the method actions in a first fronthaul network unit RU1, RU2, . . . , RUm, DU1, DU2, . . . , DUn for synchronizing with a second fronthaul network unit GM; DU1, DU2, . . . , DUn across a fronthaul network 100 carrying Time-Division Duplex, TDD, radio transmissions, the first fronthaul network unit RU1, RU2, . . . , RUm, DU1, DU2, . . . , DUn may comprise the following arrangement depicted in FIG. 10 FIG. 10 shows a schematic block diagram of embodiments of a first fronthaul network unit RU1, RU2, . . . , RUm, DU1, DU2, . . . , DUn. The embodiments of the first fronthaul network unit RU1, RU2, . . . , RUm, DU1, DU2, . . . , DUn described herein may be considered as independent embodiments or may be considered in any combination with each other to describe non-limiting examples of the example embodiments described herein.

The first fronthaul network unit RU1, RU2, . . . , RUm, DU1, DU2, . . . , DUn may comprise processing circuitry 1010 and a memory 1020. The processing circuitry 1010 may also comprise a receiving module 1011 and a transmitting module 1012. The receiving module 1011 and the transmitting module 1012 may be configured to communicate and perform transmissions over the packet-based fronthaul network 100, for example, transmit and receive payload data for TDD radio transmissions, and transmit and receive synchronization messages, e.g. PTP messages. The receiving module 1011 and the transmitting module 1012 may also form part of a single transceiver. It should also be noted that some or all of the functionality described in the embodiments above as being performed by the first fronthaul network unit RU1, RU2, . . . , RUm, DU1, DU2, . . . , DUn may be provided by the processing circuitry 1010 executing instructions stored on a computer-readable medium, such as, e.g. the memory 1020 shown in FIG. 10. Alternative embodiments of the first fronthaul network unit RU1, RU2, . . . , RUm, DU1, DU2, . . . , DUn may comprise additional components, such as, for example, an obtaining module 1013, a determining module 1014, and a synchronization module 1015, each responsible for providing its respective functionality necessary to support the embodiments described herein.

The first fronthaul network unit RU1, RU2, ..., RUm, DU1, DU2, ..., DUn or processing circuitry 1010 is configured to, or may comprise the obtaining module 1013 configured to, obtain control information indicating uplink, UL, and downlink, DL, time periods for the TDD radio transmissions over a radio interface. The first fronthaul network unit RU1, RU2, ..., RUm, DU1, DU2, ..., DUn or processing circuitry 1010 is also configured to, or may comprise the obtaining module 1013 configured to, obtain local timing information in the first fronthaul network unit indicating the actual timing of the TDD radio transmissions over the fronthaul network 100. Further, the first fronthaul network unit RU1, RU2, ..., RUm, DU1, DU2, ..., DUn or processing circuitry 1010 is also configured to, or may comprise the determining module 1014 configured to, determine, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul DL direction. The first fronthaul network unit RU1, RU2, ..., RUm, DU1, DU2, ..., DUn or processing circuitry 1010 is also configured to, or may comprise the determining module 1014 configured to, determine first sets of synchronization messages that has been transferred between the first and second fronthaul network unit within the determined fronthaul DL and UL time intervals, and second sets of synchronization messages that has been transferred between the first and second fronthaul network unit outside the determined fronthaul DL and UL time intervals. Furthermore, the first fronthaul network unit RU1, RU2, ..., RUm, DU1, DU2, ..., DUn or processing circuitry 1010 is also configured to, or may comprise the synchronization module 1015 configured to, synchronize, based on the synchronization messages, time and/or frequency information in the first fronthaul network unit depending on which of the first and/or second sets the synchronization messages belongs to.

In some embodiments, the first fronthaul network unit RU1, RU2, ..., RUm, DU1, DU2, ..., DUn or processing circuitry 1010 may be configured to, or may comprise the synchronize module 1015 configured to, synchronize the time and/or frequency information based on synchronization messages that belongs to the first sets of synchronization messages. Also, in some embodiments, the first fronthaul network unit RU1, RU2, ..., RUm, DU1, DU2, ..., DUn or processing circuitry 1010 may be configured to, or may comprise the synchronization module 1015 configured to, synchronize the time and/or frequency information based on a time offset estimated using the synchronization messages that belongs to the first sets of synchronization messages. Further, in some embodiments, the first fronthaul network unit RU1, RU2, ..., RUm, DU1, DU2, ..., DUn or processing circuitry 1010 may be configured to, or may comprise the synchronization module 1015 configured to, estimate the timing offset as a mean or median value of time delays in the fronthaul network 100 for the synchronization messages that belongs to the first sets of synchronization messages.

In some embodiments, the first fronthaul network unit RU1, RU2, ..., RUm, DU1, DU2, ..., DUn or processing circuitry 1010 may also be configured to, or may comprise the synchronization module 1015 configured to, synchronize the time and/or frequency information based on one or more synchronization messages that belongs to the second sets of synchronization messages. According to some embodiments, the first fronthaul network unit RU1, RU2, ..., RUm, DU1, DU2, ..., DUn or processing circuitry 1010 may also be configured to, or may comprise the synchronization module 1015 configured to, synchronize the time and/or frequency information based on synchronization messages that belongs to both the first and second sets of synchronization messages by filtering the synchronization messages using a model-based filter, wherein the model-based filter is adapted to the difference in delay variance between the one or more synchronization messages that belongs to the second sets of synchronization messages and the synchronization messages that belongs to the first sets of synchronization messages.

In some embodiments, the obtained control information may comprise one or more of: a time slot format sequence information of the fronthaul network 100, a TDD configuration information of the fronthaul network 100, and control information indicating points in time where a switch between UL and DL transmissions is to be performed in the fronthaul network 100. Also, the obtained local timing information may comprise one or more of: a local clock time value, a local I/Q sample count, a timing strobe indicating a frame or slot start, a sample, slot, subframe or frame counter for incoming data-packets over the fronthaul network 100, and a first symbol indicator for incoming data-packets over the fronthaul network 100.

Further, in some embodiments, the first fronthaul network unit RU1, RU2, ..., RUm, DU1, DU2, ..., DUn or processing circuitry 1010 may be configured to, or may comprise the synchronization module 1015 configured to, synchronize the time or frequency information by updating a Real-Time Clock, RTC, in the first fronthaul network unit RU1, RU2, ..., RUm, DU1, DU2, ..., DUn. In some case, according to some embodiments, the fronthaul network 100 is full-duplex and the synchronization messages are time-stamped data packets according to a packet-based synchronization protocol, such as, e.g. PTP. Also, according to some embodiments, the first fronthaul network unit RU1, RU2, ..., RUm, DU1, DU2, ..., DUn may be any type of fronthaul network unit that acts as a slave unit in accordance with the packet-based synchronization protocol, such as, e.g. a PTP slave unit.

Furthermore, the embodiments of the first fronthaul network unit RU1, RU2, ..., RUm, DU1, DU2, ..., DUn for synchronizing with a second fronthaul network unit GM; DU1, DU2, ..., DUN across a fronthaul network 100 carrying TDD radio transmissions, described above may be implemented through one or more processors, such as the processing circuitry 1010 in the first fronthaul network unit RU1, RU2, ..., RUm, DU1, DU2, ..., DUn depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the first fronthaul network unit RU1, RU2, ..., RUm, DU1, DU2, ..., DUn. The data carrier, or computer readable medium, may be one of an electronic signal, optical signal, radio signal, or computer-readable storage medium. The computer program code may e.g. be provided as pure program code in the first fronthaul network unit RU1, RU2, ..., RUm, DU1, DU2, ..., DUn or on a server and downloaded to the first fronthaul network unit RU1, RU2, ..., RUm, DU1, DU2, ..., DUn. Thus, it should be noted that the modules of the first fronthaul network unit RU1, RU2, ..., RUm, DU1, DU2, ..., Dun, may in some embodiments be implemented as computer programs stored in memory, e.g. in the memory modules 1020 in FIG. 10, for execution by processors or processing modules, e.g. the processing circuitry 1010 of FIG. 10.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1020 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

BMCA Best Master Clock Algorithm
CPRI Common Public Radio Interface
DL Downlink
GM Grand Master
GNSS Global Navigation Satellite System
GPS Global Positioning System
HW Hardware
IRU Indoor Radio Unit
OFDM Orthogonal Frequency Division Multiplexing
OTDOA Observed Time Difference of Arrival
PDV Packet Delay Variation
PTP Precision Time Protocol
PLL Phase-Locked Loop
RF Radio Frequency
RRU Remote Radio Unit
RRH Remote Radio Head
RTC Real-time Clock
RF Radio Frequency
SW Software
TAE Timing Alignment Error
TDD Time-Division Duplexing
TSN Time-sensitive networking
UL Uplink

The invention claimed is:

1. A method performed by a first fronthaul network unit for synchronizing with a second fronthaul network unit across a fronthaul network carrying Time-Division Duplex (TDD) radio transmissions, the method comprising
    obtaining control information indicating uplink (UL) and downlink (DL) time periods for the TDD radio transmissions over a radio interface;
    obtaining local timing information in the first fronthaul network unit indicating the actual timing of the TDD radio transmissions over the fronthaul network;
    determining, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul UL direction;
    determining first sets of synchronization messages that has been transferred between the first and second fronthaul network unit within the determined fronthaul DL and UL time intervals, and second sets of synchronization messages that has been transferred between the first and second fronthaul network unit outside the determined fronthaul DL and UL time intervals; and
    synchronizing, based on the synchronization messages, time and/or frequency information in the first fronthaul network unit depending on which of the first and/or second sets the synchronization messages belongs to.

2. The method of claim 1, wherein the synchronizing is based on synchronization messages that belongs to the first sets of synchronization messages.

3. The method of claim 2, wherein the synchronizing is based on a time offset (x ^) that is estimated using the synchronization messages that belongs to the first sets of synchronization messages.

4. The method of claim 3, wherein the time offset ($\hat{x}$) is estimated based on a calculation using one or more time delays in the fronthaul network for synchronization messages that belongs to the first sets of synchronization messages.

5. The method of claim 2, wherein the synchronizing is further based on one or more synchronization messages that belongs to the second sets of synchronization messages.

6. The method of claim 5, wherein the synchronizing is further based on synchronization messages that belongs to each of the first and second sets of synchronization messages and performed by filtering the synchronization messages using a model-based filter, wherein the model-based filter is adapted to the difference in delay variance between the one or more synchronization messages that belongs to the second sets of synchronization messages and the synchronization messages that belongs to the first sets of synchronization messages.

7. The method of claim 1, wherein the obtained control information comprises:
    time slot format sequence information for the radio interface;
    TDD configuration information for the radio interface; and/or
    control information indicating points in time where a switch between UL and DL transmissions over the radio interface.

8. The method of claim 1, wherein the obtained local timing information comprises:
    a local clock time value;
    a local I/Q sample count;
    a timing strobe indicating a frame or slot start;
    a sample, slot, subframe or frame counter for incoming data-packets over the fronthaul network; and/or
    a first symbol indicator for incoming data-packets over the fronthaul network.

9. The method of claim 1, wherein the synchronizing further comprises updating a Real-Time Clock (RTC) in the first fronthaul network unit.

10. The method of claim 1, wherein the fronthaul network is full-duplex, and the synchronization messages are time-stamped data packets according to a packet-based synchronization protocol.

11. The method of claim 1, wherein the first fronthaul network unit is any type of fronthaul network unit acting as a slave unit in respect to synchronization of its time and frequency information.

12. The method of claim 1, wherein first network unit is one of a Radio Frequency (RF) processing unit or a baseband processing unit.

13. A non-transitory computer readable storage medium storing a computer program comprising instructions, executable by processing circuitry of an apparatus, for configuring the apparatus to perform the method of claim 1.

14. A first fronthaul network unit for synchronizing with a second fronthaul network unit across a fronthaul network carrying Time-Division Duplex, TDD, (TDD) radio transmissions, the first fronthaul network unit comprising:
    a processor and
    memory containing instructions executable by the processor for configuring the first fronthaul network unit to:
        obtain control information indicating uplink (UL) and downlink (DL) time periods for the TDD radio transmissions over a radio interface,
        obtain local timing information in the first fronthaul network unit indicating the actual timing of the TDD radio transmissions over the fronthaul network,
        determine, based on the obtained control and local timing information, fronthaul DL time intervals during which there are no TDD radio transmissions transferred between the first and second fronthaul network unit in the fronthaul DL direction, and fronthaul UL time intervals during which there are no TDD radio transmissions transferred between the first and second fronthaul network unit in the fronthaul UL direction,
        determine first sets of synchronization messages that has been transferred between the first and second fronthaul network unit within the determined fronthaul DL and UL time intervals, and second sets of synchronization messages that has been transferred between the first and second fronthaul network unit outside the determined fronthaul DL and UL time intervals, and
        synchronize, based on the synchronization messages, time and/or frequency information in the first fronthaul network unit depending on which of the first and/or second sets the synchronization messages belongs to.

15. The first fronthaul network unit of claim 14, further configured to synchronize the time and/or frequency information based on synchronization messages that belongs to the first sets of synchronization messages.

16. The first fronthaul network unit of claim 15, further configured to synchronize the time and/or frequency information based on a time offset estimated using the synchronization messages that belongs to the first sets of synchronization messages.

17. The first fronthaul network unit of claim 16, further configured to estimate the timing offset as a mean or median value of time delays in the fronthaul network for the synchronization messages that belongs to the first sets of synchronization messages.

18. The first fronthaul network unit of claim 15, further configured to synchronize the time and/or frequency information based on one or more synchronization messages that belongs to the second sets of synchronization messages.

19. The first fronthaul network unit of claim 14, further configured to synchronize the time and/or frequency information based on synchronization messages that belongs to both the first and second sets of synchronization messages by filtering the synchronization messages using a model-based filter, wherein the model-based filter is adapted to the difference in delay variance between the one or more synchronization messages that belongs to the second sets of synchronization messages and the synchronization messages that belongs to the first sets of synchronization messages.

20. The first fronthaul network unit of claim 14, wherein the obtained control information comprises:
    time slot format sequence information of the fronthaul network;
    TDD configuration information of the fronthaul network; and/or
    control information indicating points in time where a switch between UL and DL transmissions is to be performed in the fronthaul network.

* * * * *